United States Patent
Reinsel et al.

[19]

[11] Patent Number: 5,908,555
[45] Date of Patent: Jun. 1, 1999

[54] ANOXIC BIOTREATMENT CELL

[75] Inventors: Mark A. Reinsel, Helena; Maxwell K. Botz, Clancy, both of Mont.

[73] Assignee: Hydrometrics, Inc., Helena, Mont.

[21] Appl. No.: 08/921,137

[22] Filed: Aug. 29, 1997

[51] Int. Cl.[6] .................................................. C02F 3/06
[52] U.S. Cl. .......................... 210/610; 210/614; 210/617; 210/903
[58] Field of Search .................. 210/150, 151, 210/605, 610, 614, 617, 903

[56] References Cited

U.S. PATENT DOCUMENTS

| | | | |
|---|---|---|---|
| 624,985 | 5/1899 | Scott-Moncrieff | 210/617 |
| 4,225,430 | 9/1980 | Bosman | 210/903 |
| 4,465,594 | 8/1984 | Laak | 210/903 |
| 4,561,974 | 12/1985 | Bernard et al. | 210/617 |
| 4,627,917 | 12/1986 | Morper | 210/150 |
| 4,800,021 | 1/1989 | Desbos | 210/150 |
| 4,925,552 | 5/1990 | Bateson et al. | 210/617 |
| 5,217,616 | 6/1993 | Sanyal et al. | 210/150 |
| 5,458,799 | 10/1995 | Odegaard | 210/616 |
| 5,462,666 | 10/1995 | Kimmel | 210/617 |
| 5,543,039 | 8/1996 | Odegaard | 210/150 |
| 5,626,754 | 5/1997 | Ballnus | 210/614 |
| 5,632,715 | 5/1997 | Harrington et al. | 588/256 |
| 5,681,471 | 10/1997 | Silverstein . | |
| 5,707,513 | 1/1998 | Jowett et al. | 210/617 |

OTHER PUBLICATIONS

Eckenfelder, "Principles of Water Quality Management", 1980 p. 303.

*Primary Examiner*—Christopher Upton
*Attorney, Agent, or Firm*—DeLio & Peterson, LLC; John J. Tomaszewski; Kenneth A. Koch

[57] ABSTRACT

A biotreatment cell for removing nitrate from water is provided comprising a closed tank having an inlet port and an outlet port, and containing therein particulate matter which forms a fixed porous bed on which microorganisms form a biofilm. Water travels from the inlet to the outlet thereby passing through the bed. The particulate matter has a density and size sufficient to form a fixed bed during the nitrate removal process and provides a bed having a porosity of about 0.25 to 0.95, preferably about 0.45. The bed material is preferably geochemically stable natural rock crushed to promote a specific size distribution. A method and additive system to maintain the nutrient phosphate level at a controlled effluent concentration are also provided for efficiently removing nitrate from water using the biotreatment cell of the invention.

6 Claims, 1 Drawing Sheet

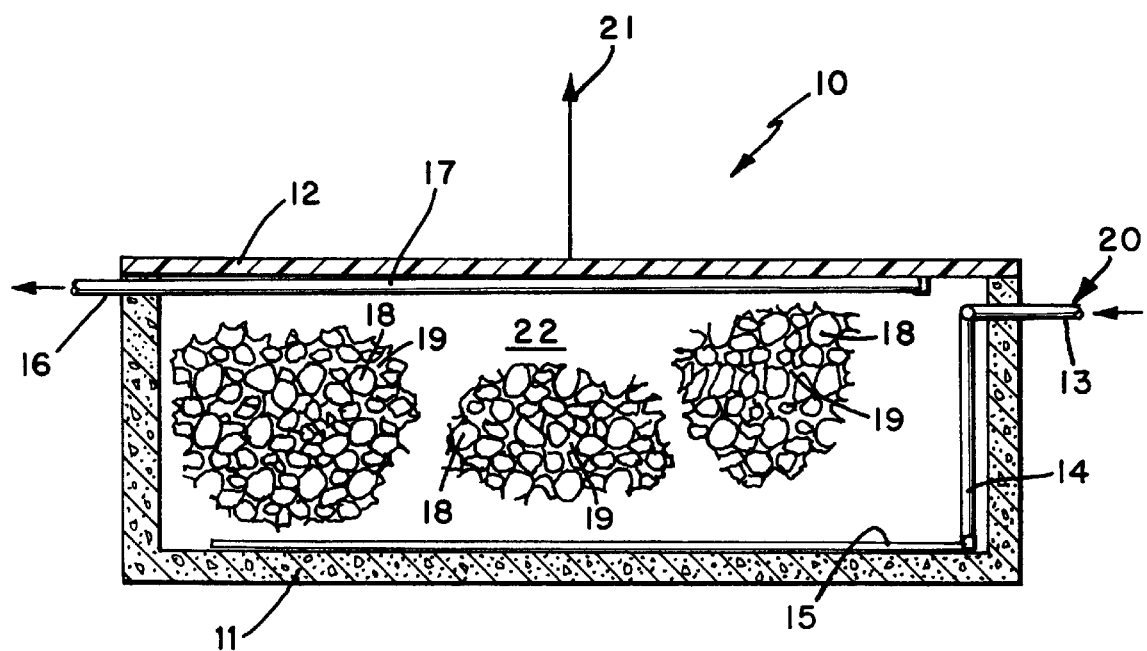

ANOXIC BIOTREATMENT CELL

BACKGROUND OF THE INVENTION

1. Field of the Invention

This invention relates generally to the purification of water and, in particular, to the removal of nitrate from water using a biological treatment method and an apparatus for performing the method.

2. Description of Related Art

Pollution is a serious environmental problem for both industry and the public. Of particular concern are streams and lakes used as water supplies, since government regulations limit the amount of various substances which may be present in water. In general, there are a number of different methods for the purification of water which include mechanical treatment by sedimentation, filtration or membranes; chemical purification through use of chemicals, gases or resins; and biological treatment by mixing the water with bacteria to convert pollutants to innocuous byproducts. The following description will be directed to biological purification of water using bacteria and, in particular, to the removal of nitrate from water, and it will be appreciated by those skilled in the art that the method and apparatus of the invention may be used for other purification processes.

Nitrate is normally present in waters associated with mining (as a result of blasting activities using ammonium nitrate or dynamite) and may be mobilized in water through other industrial activities. It may also be present in ground water and surface water in agricultural areas from fertilizer use. Nitrate is also normally present in municipal and some industrial waste streams after the aerobic degradation of ammonia.

The concentration of nitrate in water is of primary concern due to potential human health impacts from water consumption. The toxicity of nitrate to humans is due to the body's conversion of nitrate to nitrite, particularly in infants. Elevated nitrite levels can cause reduced oxygen concentration in the bloodstream, a condition known as methemoglobinemia. Accordingly, the maximum allowable limit for nitrate in federal drinking water regulations has been set at 10 mg/L as nitrogen. Discharge of nitrate-containing waters to surface water is also a regulatory concern because, as a limiting nutrient, nitrate potentially can cause undesirable aquatic plant growth.

Numerous technologies have been developed and used as a means of removing nitrates from water. Ion exchange and reverse osmosis have been successfully used worldwide for over 20 years to remove or reduce nitrate and other ions to low concentrations, but their primary disadvantages are high capital and operating costs, and generation of a concentrated waste stream. Conventional biotreatment systems have also been used for many years, primarily in municipal waste water treatment plants. These technologies include sequencing batch reactors, rotating biological contactors, and packed-bed or fluidized-bed systems. While costs for conventional biotreatment systems are generally lower than those for ion exchange and reverse osmosis, costs are still substantial and a biomass waste stream must be handled.

The term "biofilm" as used herein may be defined as a layer of a biomass on a substrate. The biomass is composed of bacteria and bacterial products in which the bacteria may be of aerobic, anoxic or anaerobic type depending on the kind of purification process employed. In aerobic processes, microorganisms need oxygen to grow while with an anaerobic process, microorganisms must have an oxygen-free environment. An anoxic environment generally contains low concentrations of oxygen and does not have to be completely without oxygen as in an anaerobic environment.

In a biofilm system, microorganisms grow on fixed surfaces in the bioreactor or biotreatment cell. The biofilm grows in thickness as the microorganisms propagate, and part of the biofilm will eventually detach and new biofilm will be formed. Biofilm reactors in use today are based on different systems such as biorotors (rotating biological contactors), trickling filters, fluidized bed reactors and a stationary bioreactor wherein the substrate on which the microorganisms grow is immersed in the reactor and is stationary while the water contacts the substrate while traveling through the bioreactor to the outlet. U.S. Pat. Nos. 5,458,779 and 5,543,039 to Odegaard show a method and a reactor suitable for the purification of water by biological methods and the patents are hereby incorporated by reference. The patents discuss the many types of bioreactors and disclose a method wherein the biofilm grows on specially configured plastic carriers which are kept suspended (fluidized) in the water in the reactor.

Nitrogen present in the form of dissolved nitrate may be removed from water through the action of denitrifying bacteria (DNB), which convert the nitrate to nitrogen gas ($N_2$). DNB are facultative anaerobes, meaning that they reduce oxygen preferentially over nitrate and will only reduce nitrate when oxygen is not readily available. Therefore, microbial nitrate reduction can only occur in anoxic or anaerobic environments. Nitrate removal from water is often preceded by nitrification in which ammonia nitrogen is aerobically oxidized to nitrate. Nitrification is not generally required if most of the nitrogen in the water is already in the nitrate form.

In the nitrate removal process, an external carbon source such as methanol is often added to enhance denitrification. The carbon source serves as an electron donor (is oxidized to $CO_2$) while nitrate acts as the electron accepter (is reduced to $N_2$). This reaction in which the methanol supplies electrons to produce energy is called dissimilatory nitrate reduction. Methanol is also required to supply the carbon for creating new cell mass in the reaction, called assimilatory nitrate reduction. When converted to a mass basis, about 2.5 g of methanol are required to reduce 1 g of nitrate (as nitrogen) to nitrogen gas. The nitrogen and carbon dioxide gases produced in the reactions are typically in excess of the amounts which are soluble in water, which requires that the bioreactor have a venting system. Other carbon sources such as acetic acid or sucrose may be used. Nutrients such as phosphates are also required for bacterial growth.

Any suitable DNB may be used; they are generally mesophilic organisms which prefer temperatures of 20°–30° C., but may also be used at lower temperatures. Denitrification processes have been designed in industry as either suspended-growth systems, in which microorganisms are suspended in a stirred liquid, or as attached-growth systems, in which DNB are attached to a porous media with the water flowing past the media in the bioreactor. Attached-growth systems (specifically packed-bed reactors) are the area of particular concern in the present application.

Bearing in mind the problems and deficiencies of the prior art, it is therefore an object of the present invention to provide a biological method for removing contaminants from water and, in particular, for removing nitrates from water using denitrifying bacteria and an anoxic bioreactor.

It is a further object of the present invention to provide an anoxic bioreactor for use in removing contaminants from water and, in particular, removing nitrates from water.

Other objects and advantages of the present invention will be readily apparent from the following description.

SUMMARY OF THE INVENTION

The above and other objects, which will be apparent to those skilled in the art, are achieved in the present invention which is directed in a first aspect to a biotreatment cell, preferably an anoxic biotreatment cell, for removing pollutants such as nitrates from water comprising:

a tank, preferably closed, having an inlet port and outlet port located and configured with respect to the tank so as to allow water from the inlet port to flow through a fixed particulate bed in said tank to the outlet port; and particulate matter disposed within the tank forming a fixed particulate porous bed through which water travels from the inlet port to the outlet port, the particulate matter having a density and a size sufficient to form the fixed porous bed during nitrate removal with the bed having a porosity (void fraction) of about 0.25 to 0.95, preferably about 0.3 to 0.7, e.g., about 0.45 and wherein microorganisms added to the tank to remove the pollutants form a biofilm on the surface of the particulate matter.

In another aspect of the invention, a method is provided for removing nitrate from water comprising the steps of:

introducing a nitrate-degrading bacteria to a tank, preferably closed, having an inlet port and an outlet port with the tank having therein a bed of particulate matter to which the bacteria adheres and multiplies thereon forming a biofilm on the surface of the bed, the particulate matter having a density and size sufficient to form a fixed bed during nitrate removal with the bed having a porosity (void fraction) of about 0.25 to 0.95, preferably about 0.3 to 0.7, e.g., about 0.45;

introducing the nitrate-containing water into the tank through the inlet port and flowing the water through the bed to the outlet port for an effective time to decrease the nitrate concentration to a desired level; and removing the nitrate-reduced water from the tank through the outlet port.

BRIEF DESCRIPTION OF THE DRAWINGS

The features of the invention believed to be novel and the elements characteristic of the invention are set forth with particularity in the appended claims. The FIGURE is for illustration purposes only and is not drawn to scale. The invention itself, however, both as to organization and method of operation, may best be understood by reference to the detailed description which follows taken in conjunction with the accompanying drawing in which the figure shows, in a partially cut-away schematic, a bioreactor of the invention.

DESCRIPTION OF THE PREFERRED EMBODIMENT

In describing the preferred embodiment of the present invention, reference will be made herein to the figure. Features of the invention are not necessarily shown to scale in the drawing.

The biotreatment cell of the invention may be generally described as a porous media-filled, attached-growth denitrification reactor. The biotreatment cell is closed and directs the flow of water from the inlet to the outlet. The size of the biotreatment cell may vary greatly depending on the amount of water to be purified in the cell per unit time and on the concentration of nitrate to be removed, and may be made of any suitable material including metal, plastic and cementious-type products. The biotreatment cell is generally rectangular in shape but can be in other configurations, and has an inlet port and an outlet port. Depending on the reaction conditions desired, the cell may be insulated to minimize heat loss and can be located in the ground where the ground will serve as a natural insulator. As will be discussed more fully hereinbelow, a fixed bed is formed in the cell and the media forming the bed are of a size and density such that the media are not substantially fluidized (are preferably stationary) during the denitrification process, and which bed may also be subjected to hydraulic back-flushing to clean the reactor and to remove reactive bio-products and impurities. It is preferred to operate the bioreactors in an upflow mode (water flowing from the bottom of the cell to the top of the cell) but either upflow or downflow modes can be employed.

It is an additional feature of the invention that additives used in the biotreatment cell for the denitrification reaction be specially monitored to provide enhanced operating results. In particular, it has been found that if the amount of phosphate leaving the reactor is controlled at a concentration preferably about or above 0.10 mg/l as phosphorus, enhanced denitrification yields result. This feature of the invention will be more fully discussed hereinbelow.

Referring now to the figure, the biotreatment cell is generally shown as numeral 10. The cell 10 comprises a tank or vessel 11 made from a material such as concrete, wood or steel and having an insulating cover 12 made from materials such as wood and foam insulation. The tank 11 and cover 12 form a closed treatment area in which a natural rock media 18 is contained, forming a porous process bed 22. The rock media 18 is of a random shape and forms a bed 22 having openings 19 between the media through which the water passes from the inlet of the tank 13 to the outlet of the tank 16.

An inlet port 13 is shown connected to a downward header pipe 14 which is diverted at the base of the tank to distribution lateral pipes 15 (laterals). Generally, the header pipe 14 is a larger pipe than the distribution laterals and at the base of the tank, a number of distribution laterals 15 are fed from the header pipe 14. Typically, a plurality of distribution laterals 15 are distributed in parallel along the longitudinal axis of the tank and spaced equally apart across the width of the tank. A plurality of header pipes 14 may also be used but it is important that a plurality of distribution laterals 15 be placed near the bottom of the tank, preferably along the bottom of the tank and across the width of the tank to enable water entering the tank to being uniformly distributed as it enters the tank.

The water entering the tank through inlet 13 traverses through the bed 22 through openings 19 between the porous media 18 and is collected at the top of the tank in collection lateral pipes 17. It is important that a plurality of collection laterals 17 be placed across the top of the tank and across the width of the tank to enable water exiting the tank to be uniformly collected as it passes through the tank. Water collected in the collection laterals 17 is then transferred out of tank 10 through outlet port 16. A vent 21 is shown which is used for discharging formed nitrogen gas and carbon dioxide to the atmosphere or to a collection vessel. The system shown in the figure uses upflow. For a downflow system, the locations of the distribution and collection systems would be reversed.

Not shown in the figure for clarity is the biofilm that will be formed on the surfaces of the media 18. This biofilm will be contacted by the water as it travels through the bed 22 from the inlet port 13 to the outlet port 16. The biofilm formed on the bed surface does not significantly affect the bed porosity as defined hereinabove and the bed porosity is defined as the porosity of the bed formed by the particulate matter without the biofilm attached thereto.

It is preferred that the distribution laterals 15 and the collection laterals 17 be at the bottom and top of the tank 10, respectively. Both the distribution laterals 15 and the collection laterals 17 will have openings therein to allow the outflow of the water to be purified and the collection of the purified water, respectively. The size of the distribution laterals 15, collection laterals 17 and openings therein may vary widely depending on the size of the tank 10 and the throughput of the water in the process.

With regard to the media 18 of the cell which forms the porous bed 22 through which the water travels during the purification process, the media may be of any material such as plastic, concrete, natural rock and the like, and are of a size and density such that they are not fluidized (i.e., they form a stationary bed) during the process but are amenable to hydraulic backflushing. The preferred media form a fixed bed system and microorganisms grow on the surface of the bed media, forming a biofilm over which the water travels. Preferably, the media 18 are a geochemically stable natural media such as natural gravel, crushed rock or plastic spheres. The media material must be dense, durable and free of minerals that would dissolve and contribute parameters such as metals that would be at undesirable concentrations. The natural gravel, crushed rock or artificial media must be geochemically stable in an anoxic environment and not be significantly diminished in effectiveness as a media during this time.

Natural gravel and crushed rock generally have a specific gravity typically of about 2.4 to 3.2 and it is preferred that the media be rounded to angular in shape and have an average particle size greater than about 4.6 millimeters (mm), preferably between about 12.7 mm and 110 mm, and above and most preferably about 20–30 mm, e.g., 25 mm. Artificial medias such as plastic spheres preferably have an average particle size of about 25 mm to 110 mm. Using a media of this particle size a fixed bed is formed in the tank having a porosity (void fraction) of about 0.25 to 0.95, preferably, 0.45. The media preferably have particle sizes that are uniformly randomly distributed within this particle size range, but may be of uniform shape such as plastic spheres and the like if the bed porosity is within the above ranges. The natural gravel or crushed rock bed media normally would be screened to obtain the desired size distribution. Typically, the bed will completely fill the tank. In some circumstances, the bed may be up to 80% of the height of the tank.

As discussed above, it is necessary to add certain additives to the tank for bacterial growth. In general, a carbon source and nutrients are needed for microbial growth. The carbon source is typically methanol and the nutrient source is typically a phosphate which includes phosphoric acid and other inorganic phosphates. Referring to the figure, the additives 20 may be added into input port 13 for distribution with the water in tank 10. Separate additive inlet ports may also be employed. Approximately 1 mg of phosphate (as phosphorus) is typically added for every 30 mg of nitrate (as nitrogen) removed. It has been found that if the phosphate concentration exiting the biotreatment cell is maintained at a level above about 0.01 mg/l, preferably 0.05 mg/l, and most preferably about 0.10 mg/l and above as phosphorus, that enhanced nitrate removal efficiencies are obtained.

The described reactor effectively removes nitrate at water temperatures largely unexplored in typical denitrification systems. Most conventional biotreatment systems, such as those at municipal wastewater treatment plants and other water purification facilities, operate at temperatures of 20° C. or higher. Many of these systems are located in the southern U.S., where these water temperatures can be achieved without mechanical heating. The Anoxic Biotreatment Cell (ABC) of the invention was developed to treat water at mining, milling and industrial facilities. These facilities are often located in high-altitude regions of the western and northern U.S., where ambient water temperatures are much lower than 20° C. Production-scale facilities for biological nitrate removal in Europe have successfully operated at temperatures as low as 3° C. but similar systems have not operated successfully in the U.S. However, the Anoxic Biotreament Cell of the invention was designed to operate at 12° C. and has been shown to operate successfully (greater than $70\%$ removal of nitrate) at temperatures as low as 1° C. for at least a day, and at temperatures below 4° C. for several months. This is due to the use of a bacterial consortium which was originally cultivated at low water temperatures (<15° C.) and has then evolved to effectively remove nitrate at the temperatures observed in the ABC. Such bacteria can be developed simply by acclimation to low-temperature environments. Bench-scale experiments showed that bacterial growth rates approximately doubled after steady-state conditions were first achieved at 6° C., indicating that microorganisms became more efficient as they became acclimated to the low water temperature.

The described reactor also successfully removes dissolved metals, based on data from a production-scale system. Metals concentrations can be a concern in treatment of waste water or other waters where biotreatment is used, including industrial waters where high metals concentrations are often encountered. It has been shown that when desired, the ABC can be operated at conditions such as longer residence times (several hours) which not only remove nitrate but also permit the growth of sulfate-reducing bacteria (SRB), which may also be present in the original inoculum. The residence time for nitrate removal is up to about 5 hours or more, typically 1–2 hours. The residence time for metals removed varies greatly, as it depends on the water temperature and on the nitrate concentration.

SRB produce hydrogen sulfide, which reacts almost immediately with many dissolved metals to produce insoluble metal sulfides. Dissolved metal concentrations of metals such as cadmium, chromium, copper, iron, lead and zinc were reduced in the effluent and typically were below analytical detection limits. For example, the manganese concentration was reduced in the reactor from 0.045 mg/l to about 0.01 mg/L. The sulfides precipitate in the reactor and may be removed periodically by backflushing the system through much higher-than-normal water flows and/or agitation with air.

Another advantage of the system of the invention is its relatively low cost. The ABC can be installed at less than one-half the capital cost of alternate technologies such as conventional biotreatment, chemical treatment or physical treatment. Operating costs are also lower than those for alternate technologies.

EXAMPLE 1

A biotreatment cell such as that shown in FIG. 1 was filled with crushed rock media having an average particle size of about 25 mm to form a porous bed. The bed had porosity of about 0.45. A bacterial inoculum taken from the denitrification unit at a municipal wastewater treatment plant was added to the tank and formed a biofilm on the surface of the rock media. The tank was approximately 28 feet long, 24 feet wide and 6 feet high and over a period of more than a month, a water stream containing nitrate at about 13 mg/l was fed at a flow rate of about 130 gpm to the tank. The residence time of the water in the cell was about 1.5 hours. The nitrate removal rates averaged over 95% while the water temperature was about 14° C. and about 85% while the water temperature was about 7° C. The cell operated without any significant mechanical or process problems. The total system was constructed for much less cost than other nitrate-removal technologies considered for the site.

EXAMPLE 2

Using a tank and fixed bed similar to Example 1, the phosphate concentration in the outlet (effluent) was monitored and maintained at about 0.10 mg/l as phosphorus. With this level of phosphorus in the outlet, nitrate removal efficiency was approximately 95%. When the outlet phosphate concentration measured about 0.01 mg/l as phosphorus the nitrate removal was about 70%. This was repeated again showing nitrate removal efficiency above about 90% when the outlet phosphate concentration was maintained at or above about 0.10 mg/l, as compared to a nitrate removal efficiency of about 72% when the phosphate concentration was maintained at about 0.01 mg/l as phosphorus. These conditions were run while the water temperature was about 12° C. or greater.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for removing nitrate from water comprising the steps of:

introducing a nitrate-degrading bacteria to a tank having an inlet port and an outlet port with the tank having therein a bed of particulate matter to which the bacteria adheres and multiplies thereon forming a biofilm on the surface of the bed, the particulate matter having a density and size sufficient to form a fixed bed during nitrate removal with the bed having a porosity of about 0.25 to 0.95;

introducing the nitrate-containing water into the tank through the inlet port and flowing the water through the bed to the outlet port for an effective time to decrease the nitrate concentration to a desired level;

adding phosphate nutrient to the tank as needed;

controlling the phosphate concentration in the water so that the water leaving the outlet port of the tank has a phosphorus concentration at or above about 0.10 mg/l; and removing the nitrate-reduced water from the tank through the outlet port.

2. The method of claim 1 wherein the particulate matter has an average particle size of above about 12.7 mm.

3. The method of claim 2 wherein the particulate matter has an average particle size of about 12.7 mm to 10 mm.

4. The method of claim 2 wherein the bed porosity is about 0.3 to 0.6 and the particulate matter has an average particle size of about 20–30 mm.

5. The method of claim 4 wherein the particulate matter is geochemically stable crushed rock having a random size distribution within the particle range and the tank is closed.

6. The method of claim 5 wherein the cell is operated at a temperature below about 20° C.

* * * * *

UNITED STATES PATENT AND TRADEMARK OFFICE
CERTIFICATE OF CORRECTION

PATENT NO. : 5,908,555
DATED : June 1, 1999
INVENTOR(S) : M. Reinsel et al.

It is certified that error appears in the above-identified patent and that said Letters Patent is hereby corrected as shown below:

Column 6, line 19, "70" should not be superscript

In the Claims

Column 8, line 28, delete "10 mm" and insert therefor - - 110 mm - -

Signed and Sealed this

Fifth Day of October, 1999

Attest:

Q. TODD DICKINSON

Attesting Officer

Acting Commissioner of Patents and Trademarks